T. P. MARSTON.
TAG-FASTENER.
No. 169,650. Patented Nov. 9, 1875.
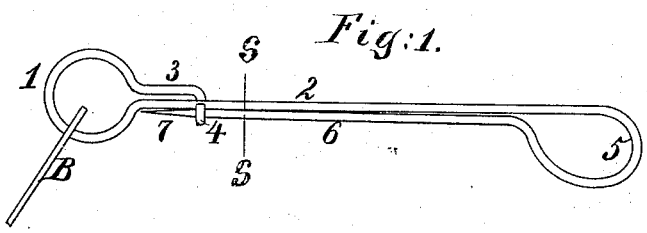
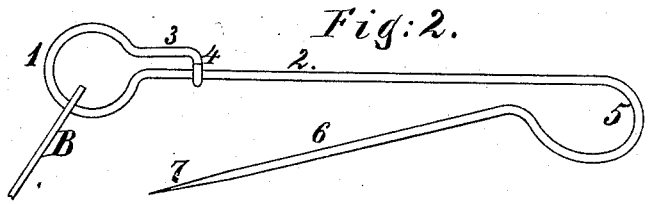
Witnesses:
Henry Gentner
Chas. C. Stetson.
Inventor:
Thomas P. Marston
by his attorney

UNITED STATES PATENT OFFICE.

THOMAS P. MARSTON, OF NEW YORK, N. Y., ASSIGNOR TO PHILLIP HAKE.

IMPROVEMENT IN TAG-FASTENERS.

Specification forming part of Letters Patent No. 169,650, dated November 9, 1875; application filed August 10, 1875.

*To all whom it may concern:*

Be it known that I, THOMAS P. MARSTON, of New York city, in the State of New York, have invented certain new and useful Improvements relating to Tag-Hooks, of which the following is a specification:

A patent to myself and N. M. Phillips, dated September 30, 1873, describes a spring-hook with the point engaging in a curved offset formed in the shank. Such has merits, but is subject to the disadvantage that the shank is weakened by the offset. In use upon a bale of cloth, or other article subject to considerable handling, the tag-hook is often subjected to severe tensile strain, tending to straighten the hook, or to elongate the shank, which latter it is desirable to preserve as strong as the size of the wire employed will afford.

I have devised a form of tag-hook which affords, among other advantages, the advantage of direct and straight extension of the shank.

The accompanying drawings form a part of this specification, and represent what I consider the best means of carrying out the invention.

Figure 1 is a side view of my hook closed. Fig. 2 is a side view of the same open; and Fig. 3 is a cross-section through the hook in its closed condition, being a section on the line S S in Fig. 1.

Similar letters of reference indicate like parts in all the figures.

The entire device may be of round brass wire in a single piece. Its several parts will be designated 1 2 3, &c. 1 is the loop which takes hold, as usual, of a tag of parchment, B. 2 is a straight shank extending, under the best conditions for strength, in a right line from the loop 1 to the ring or nearly complete ring 5 of the same wire, which is adapted to retain the edge of the woven fabric or other material in which the hook is inserted. 6 is a straight prong ending in a sharp point, 7, which, with the curve 5, forms the long-known spring-hook. So far I have described no provision for engaging and retaining the point of this hook. It is important that the point 7 be sometimes at liberty to spring out, as shown in Fig. 2, and then after it has been properly engaged with the cloth, or other goods, on which the tag B is to be used, it is important that the point 7 be locked, and preferably that it be so locked close to the shank 2. I accomplish all this by extending and peculiarly bending the wire, not in the shank 2, but beyond the loop 1. Instead of, as in ordinary tag-hooks, simply bending the wire of this loop around and abutting the end against the shank 2, I extend the end along a little distance parallel to the shank 2, as indicated by 3, and then form on the end of the part 3 a curve, 4, of sufficient size to partially embrace, not only the shank 2, but also the point or prong 6, when the latter is placed in close contact with the shank.

The operation is as follows: The prong 6 is inserted into the cloth, (not represented,) while the device is in the condition shown in Fig. 2. Then the prong 6 is forced into close contact with the shank 2, by dexterously moving either the prong 6 or the curved part 4, or both; they are engaged together, as shown in Fig. 1. The elasticity of the wire thenceforward keeps them engaged, and any strain to which the device is subjected tends to keep them still closer engaged, until, when it is desired to liberate the tag-hook, a reverse of the peculiar movement by which they were engaged disengages the prong 6 from the curved end 4. The curve 4, being in the end of the wire, does not weaken the shank. Furthermore, it, by engaging with the shank and with the prong 6, strengthens the loop 1, and makes the entire device capable, with the same size of wire, and the same size of loop 1 and loop 5, of resisting greater pulls than any hook previously known to me.

I prefer that the curve 4 shall have too little width to allow the parts 2 and 6 to lie side by side therein. In such case the part 6 lies under the shank 2, and the point 7 is better shielded.

The tags are more securely held by my hooks than by ordinary hooks.

To avoid confusion of terms we may designate the crook 4 on the end of the arm 3 by the term "catch." Its function is to serve as an open catch to embrace the shank 2, and also to embrace the hook-point 6 7, when desired.

The tag-loop 1 is elastic, and its elasticity is made available in pressing the arm 3 and the catch 4 toward the spring-point 6 7 of the hook 5 6 7, in the act of engaging the hook therewith. In other words, all the springing is not required to be done by the hook proper. A portion is done by the tag-loop.

The tag can be easily introduced into the tag-loop by slipping it on from either end of the wire, when the catch 4 is disengaged from the shank 2.

The tag-loop 1 should be in the same plane as the hook 5, as shown. Otherwise, the tag is liable to be held edgewise to the goods to which the device is engaged.

I claim as my invention—

The improved tag-hook described, having an extension or arm, 3, and catch 4 formed on the wire beyond the loop I, and having both the loop and hook elastic, and adapted to engage and hold each other, as herein specified.

In testimony whereof I have hereunto set my hand this 5th day of August, 1875, in the presence of two subscribing witnesses.

T. P. MARSTON.

Witnesses:
W. L. BENNEM,
CHAS. C. STETSON.